US012742296B2

(12) United States Patent
Bearden

(10) Patent No.: US 12,742,296 B2
(45) Date of Patent: Sep. 22, 2026

(54) LAMINATED TUFTED GOOD

(71) Applicant: John H. Bearden, Marietta, GA (US)

(72) Inventor: John H. Bearden, Marietta, GA (US)

( * ) Notice: Subject to any disclaimer, the term of this patent is extended or adjusted under 35 U.S.C. 154(b) by 0 days.

(21) Appl. No.: 19/270,229

(22) Filed: Jul. 15, 2025

(65) Prior Publication Data

US 2026/0028783 A1 Jan. 29, 2026

Related U.S. Application Data

(63) Continuation-in-part of application No. 18/784,698, filed on Jul. 25, 2024, now abandoned.

(51) Int. Cl.

*E01C 13/08* (2006.01)
*B32B 5/02* (2006.01)
*B32B 5/26* (2006.01)
*B32B 27/12* (2006.01)
*B32B 27/32* (2006.01)
*E01C 13/02* (2006.01)

(52) U.S. Cl.

CPC .............. *E01C 13/08* (2013.01); *B32B 5/024* (2013.01); *B32B 5/26* (2013.01); *B32B 27/12* (2013.01); *B32B 27/32* (2013.01); *E01C 13/02* (2013.01); *B32B 2307/41* (2013.01); *B32B 2307/412* (2013.01); *B32B 2307/7376* (2023.05)

(58) Field of Classification Search

CPC ................. E01C 13/08; B32B 2307/41; B32B 2307/414; B32B 2307/748; B32B 2310/0843; B32B 2323/04; B32B 2323/10; B32B 2471/02; B32B 27/06; B32B 27/12; B32B 27/32; B32B 3/085; B32B 37/04; B32B 5/02

See application file for complete search history.

(56) References Cited

U.S. PATENT DOCUMENTS 4,636,609 A * 1/1987 Nakamata ........... B29C 66/1122 219/121.75
11,351,766 B2 * 6/2022 Tambasco ............ D05C 17/023
(Continued)

FOREIGN PATENT DOCUMENTS

WO WO-9706004 A1 * 2/1997 ............. B29C 63/24

OTHER PUBLICATIONS

Translation of EP1076125 A1.*
(Continued)

*Primary Examiner* — Sonya M Sengupta
(74) *Attorney, Agent, or Firm* — Invenion Protection Associates, LLC

(57) ABSTRACT

An article of artificial athletic turf or other tufted good made of a fabric backing sheet having a top face and a bottom face and having yarn tufted through the backing such that yarn pile extends from the top face and yarn backloops are along the bottom face which are laminated and tuft locked by layers of polyethylene film that are separately transparent and opaque to the wavelength of a near infrared or visible energy. These polyethylene layers are placed against the backing bottom face, with the opaque layer nearest the backing, and near infrared or visible energy is projected through the transparent layer and into the opaque layer to melt the latter and cause the film layers to fuse to each other and further cause that combined film to fuse to the backing and yarn backloops and form a laminated turf product.

11 Claims, 4 Drawing Sheets

Turf Laminated with Dual Film

Film infused into woven backing

Backloops enrobed by film

No damage to woven backing fibers

Test conducted with transparent and opaque polyethylene film, opaque film melted substantially, bonding to the woven primary backing, the top of the back stitch and the transparent polyethylene film

(56) References Cited

U.S. PATENT DOCUMENTS

| | | | | |
|---|---|---|---|---|
| 2012/0234595 | A1 * | 9/2012 | Tamura | B23K 26/40 219/121.72 |
| 2019/0341735 | A1 * | 11/2019 | Apitz | H01S 3/175 |
| 2019/0352845 | A1 * | 11/2019 | Coon | B32B 27/12 |
| 2025/0033340 | A1 * | 1/2025 | Bearden | B32B 27/06 |

OTHER PUBLICATIONS

Translation of EP4467702 A1.*
Translation of WO2025163439 A1.*
Translation of WO9706004 (Year: 1997).*

* cited by examiner

FIG. 4

Damage to Primary Backing Fibers

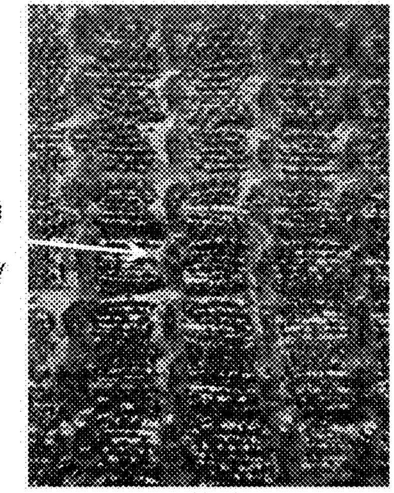

Test conducted with only transparent polyethylene film, slight bonding to primary and the top of the back stitch and major damage to the primary woven structure

FIG. 5

Turf Laminated with Dual Film

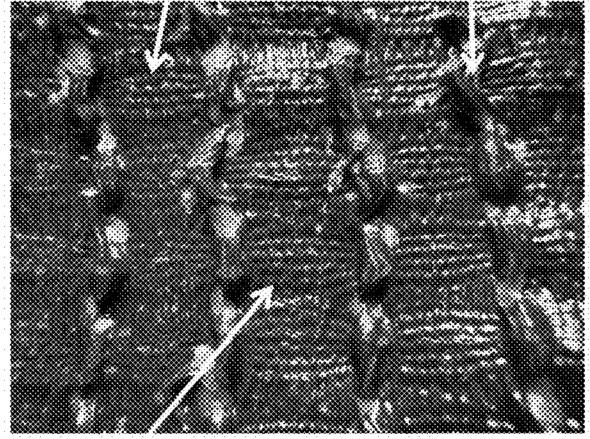

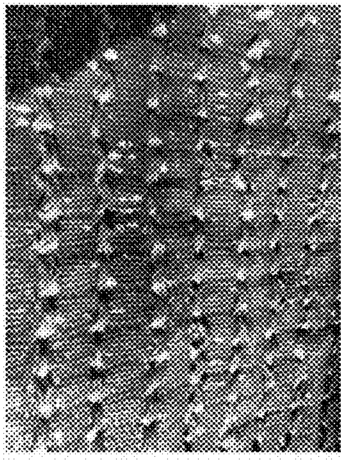

Test conducted with transparent and opaque polyethylene film, opaque film melted substantially, bonding to the woven primary backing, the top of the back stitch and the transparent polyethylene film

LAMINATED TUFTED GOOD

This application is a continuation-in-part that claims the benefit of application Ser. No. 18/784,698 filed Jul. 25, 2024. Furthermore, application Ser. No. 18/784,698 is hereby incorporated by reference.

BACKGROUND OF THE INVENTION

Artificial turf is, primarily, made of at least one backing substrate and filament yarns that imitate blades of grass. Usually, these synthetic grass yarns are made of polyethylene, and the primary backing is constructed of multiple layers of woven (and, sometimes, non-woven) polypropylene. As part of the tufting process, the yarn is inserted into the backing as loops. Those loops are, then, severed to form cut pile along a top face of the backing sheet and backloops protruding from its opposing bottom face.

The inserted yarns, or "tufts", must, then, be locked into place along the backing so that they are not easily dislodged by athletic use, in the case of artificial athletic turf, or simply due to normal wear and tear of non-athletic turf. Historically, this is achieved by applying coating material to the bottom face of the backing to enrobe the tuft backloops. Typically, the coating material used is a urethane applied in either of two forms: (a) as a liquid that requires that the coated backing be conveyed to within a heated oven environment for long enough for the urethane to cross-link into a solid, and then removed from the heat and allowed to cool and completely cure; or (b) as a two-part spray that is projected onto the backing surface and allowed to sit idle at room temperature long enough to self-cure. While urethane applied in either form can certainly be effective in achieving suitable tuft lock, it presents some notable inefficiencies in the turf manufacturing, installation, and removal processes.

To wit, as mentioned, during manufacture, curing an applied liquid state urethane coating requires that the coated backing material pass through a heating oven. Therefore, relative to the spray version of urethane coating application, liquid version application can necessitate significant capital expenditures in acquiring such an oven. Moreover, the size of both the oven and the production facility that houses it must accommodate the largest width dimension of coated backing material that a manufacturer wishes to convey through the oven. This oven size consideration can be quite significant in the athletic turf manufacturing context, as each rectangular panel of athletic turf that is to be installed adjacent other such panels to form an athletic playing field is 15 feet wide typically. So, the oven interior space must be wide enough to accommodate that turf segment width.

Not only does the coating oven-related facility space requirement have capital cost implications, it represents ongoing energy costs and other operational costs associated with temperature controlling, illuminating, and otherwise maintaining that space. Chief among those costs is the cost of energy consumed in starting and continuing heat output by the oven. Moreover, since the oven is not a closed enclosure (rather, it is an open-ended environment through which turf material is conveyed), significant heat loss occurs while it operates—which, in turn, necessitates more energy consumption in maintaining the oven temperature, and can have bearing on the amount of energy consumption needed to maintain comfortability of the indoor workspace.

From a facility space provisioning perspective, the spray coating method similarly warrants dedicating some amount of indoor space to that step of turf production so that it can be performed in an environment in which the ambient temperature and airflow are closely controllable, and in which air toxicity created by the urethane spray poses minimal health risk to facility workers. Nevertheless, even under the most ideal air current conditions, it is virtually inevitable that some volume of sprayed particles will be wasted by depositing along surfaces other than that of the intended deposit surface of the tufted backing (e.g., onto the facility floor, walls, and other equipment).

Furthermore, the spray coating process involves significant energy consumption in operating pumps and heating chemicals that are combined to form the spray mixture.

Then, regardless of which coating step was employed, after the coating is cured, discrete segments of tufted and coated backing are placed into rolls for shipping to their installation destination. The weight of those tufted goods is substantially attributed to the weight of their urethane coating element. So, there is a direct correlation between (a) the cost of shipping athletic turf from manufacturing site to installation site and (b) the volume of urethane coating material used in producing it.

Finally, long after the manufacturing and installation processes are complete, installed athletic turf eventually becomes worn and needs to be replaced at the athletic site. Fortunately, since polyethylene and polypropylene are recyclable, the degraded turf's polyethylene grass fibers can be sheared from the backing to be recycled into newly usable tufting yarn. However, the fact of urethane being adhered to the backing of a turf product renders a polypropylene backing unrecyclable and merely discardable. So, urethane coating, in either form, thwarts what would be the gained efficiency of producing a fully recyclable tufted product, but for the presence of urethane. Over time, this represents a significant lost opportunity cost.

Consequently, the present inventor recognizes that there is a great need, in the artificial athletic turf industry, to supplant urethane, as a coating material, with a recyclable material capable of achieving equal or more tuft lock strength with equal or less material (by weight), and that can be applied within a smaller dedicated production space, within a dramatically shorter production time, and consuming dramatically less energy. The present inventor further recognizes that this panacea of advancements can be achieved by replacing liquid or sprayed urethane with a combination of layers of polyethylene film—at least one such layer being transparent to near infrared or visible energy and at least one other such layer being opaque thereto (both of which can be pre-perforated, in perforation alignment, for in-use water drainage purposes)—and by replacing the step of disposing the urethane-coated tufted good in a heating oven with that of directing near infrared or visible energy into the polyethylene film layer combination to fuse together the film layers and tufted backing sheet. The present inventor also recognizes that there is a need to deliver near infrared or visible energy into the film layers in a particular fashion, because doing so is useful in achieving the aforementioned advancements without compromising the overall structural integrities of the resultant lamination film or tufted backing sheet and, therefore, where pre-perforated film is used, without diminishing or overly increasing the porosity of the resultant, fully recyclable turf product. The present invention for a method for laminating a tufted backing sheet substantially fulfills those needs.

SUMMARY OF THE INVENTION

The present invention generally relates to tufted goods, and it is specifically directed to one in which a backing substrate, tufted with synthetic grass yarn, is laminated by way of directing near infrared or visible energy through, first, polyethylene film that is substantially, if not entirely, transparent to that energy wavelength and then another polyethylene film that is substantially, if not entirely, opaque to it—both of which are laid atop and vacuum-drawn into the bottom face of the tufted substrate along which backloops of tufted yarn are exposed.

A first objective of the present invention is to produce a tufted good that has considerable tuft lock without use of any adhesive, is fully recyclable, and weighs less than its conventional counterparts of similar size. A second objective of the present invention is to employ a laminating material composition and process for fusing it to the primary backing element of the tufted good to achieve that tuft lock in a manner which is considerably more time, space, and energy efficient than conventional coating processes for achieving the same.

In one aspect of the invention, a yarn-tufted, fabric backing sheet is held inverted (i.e., yard pile side down) in order that polyethylene film (which, hereinafter, may be referred to as "layers" or "film sheet(s)" or "film(s)") and may, in fact, be: (a) a single sheet having one layer of polyethylene that is [substantially]transparent and another layer of polyethylene that is [substantially] opaque to near infrared or visible energy wavelength (these layers, typically, being previously discrete film sheets that were fused in a previous manufacturing process); or (b) a first such transparent sheet and a second such opaque sheet) may be laid against the bottom face of the backing sheet—that is, placed against the side of the backing sheet that is overlaid by back stitches ("backloops") of yarn tufts. Prior to such placement of the polyethylene film, it is anticipated that the tufted backing sheet will be tensioned into taut condition.

This can be accomplished by, for example, pinning near edges of the backing sheet to a pin conveyor assembly that would enable the film and backing sheet combination to be conveyed longitudinally past at least one near infrared or visible energy emitting mechanism stationed in [longitudinally] fixed position to operate upon the sheet combination. Alternatively, the backing sheet could be tensioned by clamping it to a static support structure. This allows it to be operated upon by a longitudinally travelling near infrared or visible energy-emitting mechanism(s). Yet another embodiment contemplates the combined film and the backing sheet being conveyed longitudinally while an energy-emitting mechanism that is mounted on a dual axis traversing mechanism sweeps over the entirety of the film sheet combination and backing to fuse them together. This configuration permits the area of near infrared or visible energy projected by the emitter to form a spot with dimensions smaller than the width of the turf, and it allows that energy delivery spot to traverse across the combined film sheet in coordination with turf conveyance such that energy is delivered substantially uniformly to every point along the interface of the two films.

In another aspect of the invention, the polyethylene films selected for use can be chosen based upon a host of characteristics to correspond with both: (a) the purpose of the tufted good and (b) the wavelength of energy used to entirely melt the opaque film and, thereby, fuse the films to each other and to the backing element of the tufted good. For example, tufted goods that are to function as home indoor carpets will have lower tuft lock requirements (i.e., the force typically required to pull and dislodge a tuft from the backing) than if they were intended to function as artificial athletic turf. So, an athletic turf may warrant use of a thicker combined film sheet composition than a home carpet would (to ensure that a greater thickness of the transparent portion of the film composition resisted melting during the lamination process and, thus, provided greater mechanical strength for the finished product). Also, in circumstances where the optical energy wavelength cannot be easily adjusted for optimum results with film sheets having given thickness dimensions and/or transparency characteristics, the exact pigmentation levels of the film sheets, especially that of the would be opaque sheet, may be selected based upon the rate at which energy will be absorbed when it is directed into the film combination. Of course, it will be desired that the would be transparent film is so devoid of dyes and fillers that near infrared or visible energy projected into it is minimally absorbed while passing through that film, while the would be opaque film contains enough dye or filler that the same energy is absorbed beginning at its proximal (to the energy source) face.

In any case, the opaque polyethylene film absorbs delivered energy to entirely melt that film and merely superficially soften and fuse to it the distal face of the transparent film adjacent the opaque film's proximal face, as well as the respective bottom face of the backing sheet and outer surfaces of the yarn backloops adjacent the opaque film's distal face. Using film sheets in this manner yields a uniformly thick lamination layer and predictable overall product weight.

In another aspect of the invention, during application of near infrared or visible energy to the film combination, a vacuum mechanism for urging film into more intimate contact with the backing should be employed. This vacuum is to both: (1) flatten the loop profiles of the tuft backloops along the bottom face of the backing sheet (thereby, increasing the surface areas of contact interface between backloop inner surfaces and backing face); and (2) maximize the aggregate surface area of sustained contact between the opaque film layer and the tufted backing sheet such that the film combination completely conforms to the topography of the flattened yarn backloops and interstitial backing surface, and it fuses to them. By maximizing the film-backing surface area contact in this way, the overall tuft bond strength of the resultant fused product is improved.

Maximizing the surface area of contact between the opaque film and the backing sheet is made more critical by the purposeful limiting of the rate of application of near infrared or visible energy directed into the film layers to only that needed to liquify the opaque polyethylene film while not melting the transparent polyethylene film or the polypropylene backing sheet beyond their respective, superficial contact interfaces with the opaque film. In fact, the ultimate objective is to laminate a tufted backing with a pre-perforated opaque film and alignedly perforated transparent film to produce satisfactory tuft lock without significantly disturbing the integrities of the perforations, the backing fabric, or the yarn fibers. In other words, the aim is to heat and liquify merely the respective surfaces of the transparent film, backing sheet, and yarn backloops that are in direct contact with the opaque film without more thoroughly heating any of the transparent film, backing sheet, or backloops to their disintegration—except that aligned perforation holes residing in both the opaque and transparent polyethylene films permit near infrared or visible energy to project through them unobstructed and be entirely absorbed by the opaquely-colored polypropylene backing material and locally disintegrate the polypropylene to, in effect, form drainage holes in the backing that are aligned with those in the films.

Moreover, since the transparent film remains substantially solid, its fusing to the thoroughly melted opaque film inhibits that liquified opaque material from laterally contracting and forming gaps significantly larger than or in addition to the preformed drainage holes in the opaque films. This renders a drainable finished turf product without having mechanically punctured the backing sheet—and one that is more dimensionally stable than would be a counterpart turf product in which only transparent lamination film was used (because the same energy allowed to broadly pass through a more transparent film and be absorbed by the opaque backing would broadly disintegrate the polypropylene backing, but for the opaque film's intervening presence).

In another aspect of the invention, relative to conventional methods for bonding coating materials to the backing substrates of tufted goods—methods that include using ovens or heat rollers to conductively heat and melt thermoplastic coating material or to cure urethane coating or to apply urethane coating material by way of spraying—the present use of near infrared or visible energy to laminate the backing with transparent and opaque polyethylene films represents considerable energy savings. For one, near infrared or visible energy will travel through the transparent film sheet, arrive at and be absorbed by the opaque film sheet, and conduct both back into the adjacent distal surface of the transparent film sheet and forward into the surfaces of the primary backing and backloops sufficient to fuse together the film sheets (if they were discrete) and infuse the liquified, opaque film material into the interstices of the fibers of the primary backing and backloops—all in an incredibly shorter time than heat in an oven environment or applied by a heat roller would conduct through the same aggregate depth of film to thoroughly liquify it and similarly fuse it to the backing.

Finally, in yet another aspect of the invention, using projection optics and an oscillating sweeping motion enables a desired level of substantially uniform near infrared or optical energy density to be delivered over a larger area of the film combination than would be delivered by a more collimated energy beam. This even further accelerates the film fusing process by increasing the pace at which either: (a) a two-dimensionally movable energy emitting mechanism can be advanced over the entire body of a stationary tufted good; or (b) a conveyor-carried tufted good can be advanced relative to either a series of spaced apart, stationary, energy-emitting mechanisms or at least one tufted good-traversing energy emitter in order to appropriately deliver energy throughout the entire length and width of the tufted good (i.e., deliver equal energy density to every position within the rectangular area of the tufted good). Of course, the rate of application of energy used should be selected based upon the exact opaqueness (and transparency) and thickness of each of the two polyethylene films used.

Other vital aspects of the invention are disclosed by the description, claims, and illustrations that follow, but in summation, the present invention represents these breakthroughs in the field of artificial athletic turf production, and it presents these advantages relative to prior art products produced and processes used in that field:

- Use of two or more film layers allows each layer to be tailored to a specific function
- All turf elements are polyethylene or polypropylene to ensure full recyclability
- The opaque film layer is situated between the transparent film layer and the backing/tufted pile system
- The opaque film layer absorbs the optical energy in a predictable manner
- The opaque film layer is heated, through its full depth, by absorbing visible or near infrared energy for rapid liquification with minimal thermal conduction therewithin
- The energy required for the lamination process is limited to only that needed to liquify the thickness of the opaque film layer (and, consequently, the immediately adjacent distal and proximal surfaces of the transparent film layer and primary backing, respectively)
- The heat transfer from the liquified opaque film layer to the immediately adjacent surfaces of the primary backing (and tuft backloops) and transparent film layer is only by thermal conduction
- The molten material of the opaque film layer infiltrates the woven backing structure and tufted yarn backloops
- The molten material of the opaque film layer fuses virtually entirely with the distal surface of the transparent layer (sans any preexisting drainage holes)
- The opaque film layer protects the polypropylene fibers of the woven primary backing from sustaining radiant heat damage
- The solid-remaining transparent film layer is urged against the liquified opaque film material, by vacuum, and it counteracts the effects of surface tension to keep that opaque molten material distributed uniformly across the transparent solid material surface (sans any preexisting drainage holes)
- Vacuum force on the solid-remaining transparent film layer urges it against the liquified opaque film material and, thereby, aids infiltration of that liquified material into the woven primary backing structure and tuft backloops
- The thickness of the solid-remaining transparent film layer adds structural stiffness and strength to the laminated article structure
- The thickness of the solid-remaining transparent film layer increases tuft lock and fiber bind by increasing shear strength of the lamination at the tuft backloops

BRIEF DESCRIPTION OF THE DRAWINGS

FIG. 4 shows photographs of a tufted good made with only a transparent film layer and without an opaque film layer; and FIG. 5 shows photographs of a tufted good of the present invention made with a transparent film layer and an opaque film layer.

DETAILED DESCRIPTION OF THE PREFERRED EMBODIMENTS

Figure 1:
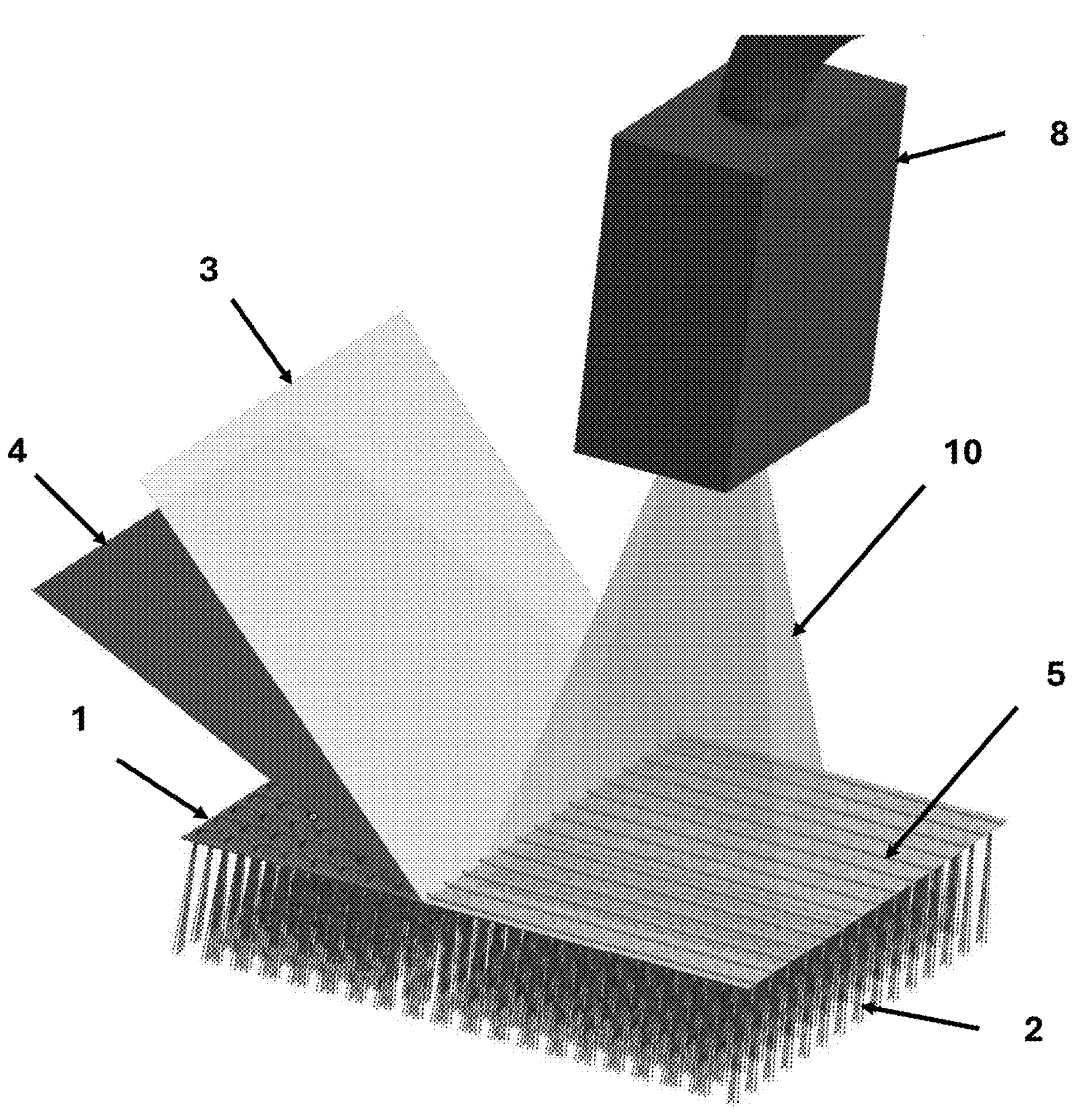
FIG. 1 is a perspective view of the energy application step of the process of the present invention.
Figure 2:
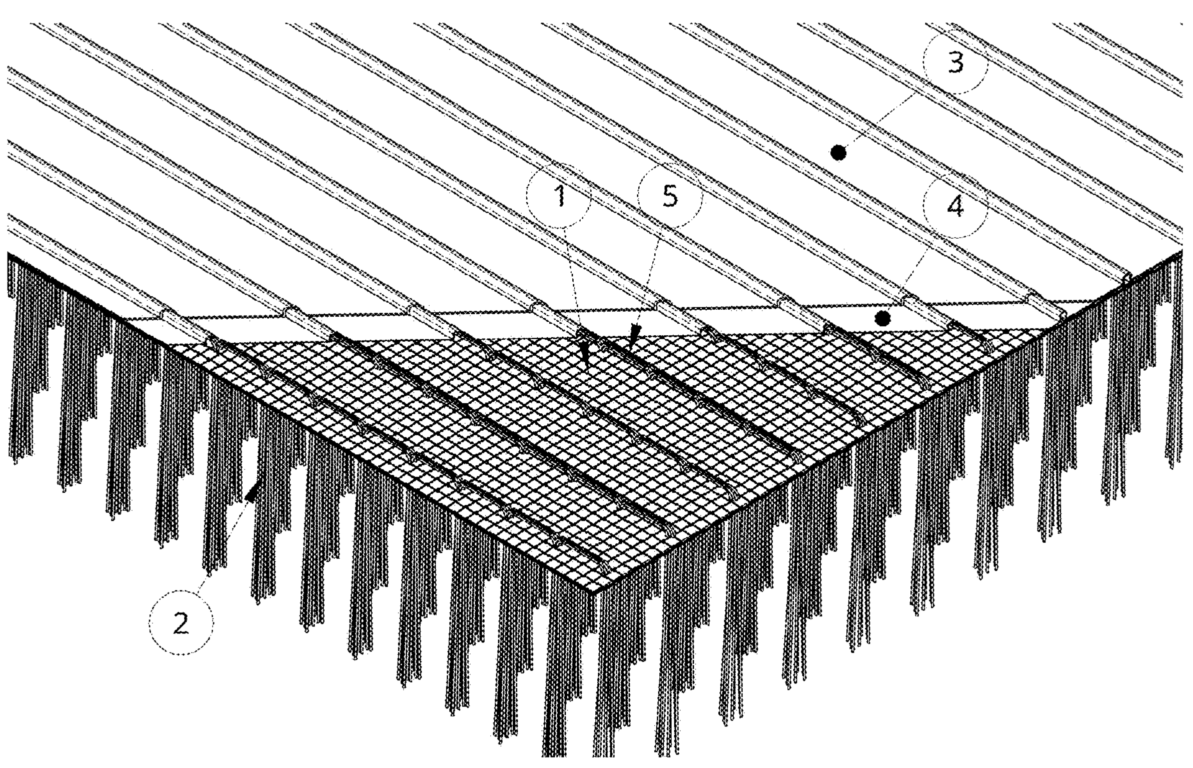
FIG. 2 is a cross-sectional perspective view of a tufted good of the present invention.
Figure 3:
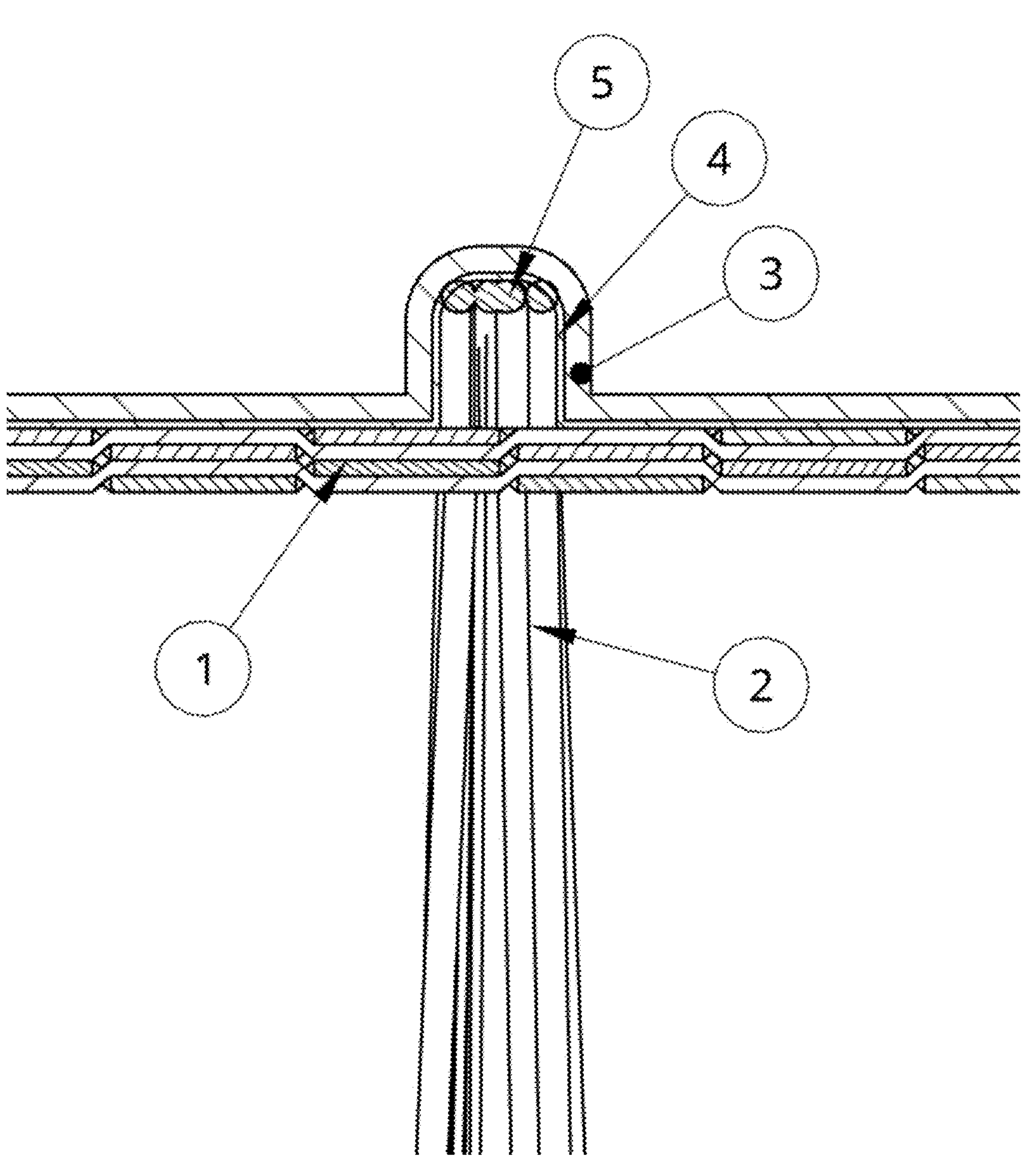
FIG. 3 is a cross-sectional elevational view of a single tuft of the same.

The present disclosure is especially applicable to the creation of artificial athletic turf. As such, artificial athletic turf is explicitly referenced hereinafter, but this disclosure can be applicable to tufted goods more broadly (e.g., household indoor carpet). With that understanding, some tangible aspects of this disclosure are embodied in the accompanying drawings, and they relate to a segment of turf product comprising the basic elements of:

(1) a polypropylene primary backing sheet 1;

(2) yarn(s) tufted into the backing sheet 1 such that the top face of the backing 1 has yarn pile 2 (specifically, cut pile in the athletic turf context) extending from it, and the opposing bottom face is partially covered by rows of yarn backloops 5 with interstitial surface areas between those rows 5 remaining exposed;

(3) an inner polyethylene film sheet 4 that is opaque to a given energy wavelength and that directly overlays the tufted backing sheet 1; and (4) an outer polyethylene film sheet 3 that is transparent to that energy wavelength, typically, is thicker than the inner film sheet 4 (preferably, the outer film 3 will have a thickness dimension of at least twice that of the inner film 4), and direct overlays the inner film 4.

In a preferred embodiment, the film sheets 3, 4 are both alignedly perforated for field drainage purposes prior to the presently disclosed production process. Also, in a preferred embodiment, these film sheets 3, 4 are discrete sheets that, as will be explained, become fused together during the present process. However, within the scope of the invention, a singular sheet featuring previously joined opaque and transparent layers may be used. The present inventor has observed that separate sheets that become fused during the present process are more malleable than their single sheet counterpart under vacuum suction force applied throughout the present process—making them more conformingly press against the contoured topography formed by the outer surfaces of yarn backloops 5 and interstitial backing surface than would a single film sheet counterpart of the same respective thicknesses of opaque and transparent polyethylene material.

Additionally, in a preferred embodiment, projected laser energy is used to fuse the film elements 3, 4 to each and to the tufted backing 1, as will be further described. Accordingly, specifically "laser" energy is repeatedly referenced hereinafter. However, it should be recognized that energy of varying wavelengths within the near infrared and visible spectrum could be used to similar effect.

With all of that understood, a process step of this disclosure is embodied in FIG. 1 which illustrates a laterally divergent, longitudinally oscillating laser beam 10 being projected towards the previously described turf elements by a laser-emitting mechanism 8. In fact, various production apparatuses that enable one or more energy emitting devices to distribute energy throughout the entire length and width of a segment of these turf elements can be employed, but in a preferred embodiment of the present method, the backing 1 and two films 3, 4 are placed onto a pin chain conveyor (not shown) that advances and retracts them together longitudinally, and a laser emitter 8 is stationed above them on a carriage that travels laterally along a gantry beam which, itself, advances and retracts longitudinally. The laser emitter 8 travels laterally along the gantry beam, and it traverses more than the full width of the turf elements below it.

In this embodiment, the turf elements are advanced by the conveyor in coordination with sensor-driven both lateral movement and laser outputting of the laser emitter 8. However, in other embodiments, the turf elements could be held in fixed position by clamping the perimeters of the backing 1 and films 3, 4 to a support frame. In either case, it is also desirable that the films 3, 4 resting atop the backing 1 be urged into more intimate contact with the backing 1 by operation of a vacuum plenum (not shown) positioned beneath the backing 1 (i.e., under the backing's downward facing top face). Where the turf elements are conveyor driven, ideally, the vacuum plenum features a mesh support surface that is part of a conveyor configuration which allows that support surface to move in synchronicity with the conveyor-driven longitudinal movements of the backing sheet 1 in direct contact with it. This minimizes friction effects.

Referring back to FIG. 1, a laser emitter 8 projects laser energy 10 down into the transparent film 3 (that is, a polyethylene sheet which is transparent to the wavelength of the laser energy projected in this case) that is laid atop the opaque [to the laser] film sheet 4 that is, itself, laid atop the bottom face of the upside down tufted backing sheet 1. Therefore, projected energy 10 will arrive at the proximal face of the transparent outer film 3, pass through its thickness, and exit the outer film's distal face without any significant energy absorption occurring within the depth layers of the outer polyethylene film 3 precisely due to that film's transparency.

When the projected energy 10 then arrives at the proximal face of the inner film 4, the energy 10 immediately begins being absorbed, because the dark coloration of the inner film 4 makes it opaque to the laser's wavelength. Consequently, the temperature of the opaque polyethylene material is raised to its melting point. That said, the present inventor observes that some form of laser projecting optics should be utilized to gain laser beam optical control and limit the density of laser energy 10 that will be absorbed at any point when the energy 10 arrives at the proximal face of the inner opaque film sheet 4. It is important to create a broader area of laser beam application having substantially uniform laser energy density than an unaltered laser beam of Gaussian distribution could realistically be anticipated to deliver.

Also, in that vein, it is preferable that the laser emitter 8 perform oscillating longitudinal sweeps of a laterally diverging laser beam 10 at 60 Hz to create a three-dimensional beam profile that it projects into the film sheets 3, 4. The projected laser energy's wavelength and the initially encountered outer polyethylene film's thickness and precise level of transparency to that wavelength will dictate whether and to what extent laser energy 10 is absorbed by the outer film 3, but it is anticipated that all of those factors are controlled such that the laser energy 10 is minimally absorbed the outer film 3 (and is not absorbed at all, ideally) and, instead, passes through the outer film 3 to encounter and be fully absorbed by the inner polyethylene film 4.

Moreover, sensors can be used to control the lateral and longitudinal movement and the laser emission 10 of the laser emitter 8 in coordination with longitudinal movement of the backing-film combination. More specifically, as the backing 1 and films 3, 4 travel longitudinally, the diverged laser beam 10—having lateral and longitudinal dimensions upon arriving at the transparent film sheet 3—is driven laterally across the gantry beam by its carriage while also being driven longitudinally by gantry movement in synchronization with longitudinal movement of the backing-film combination. This has the effect of distributing laser energy across a laterally elongate, rectangular swath of the outer film 3. The sensors will cause the longitudinal gantry motion to cease whenever the backing-film combination's longitudinal advancement stops, but the laser emitter 8 will continue moving laterally along the gantry to complete its then current lateral pass over the backing-film combination.

A subsequent pass of laser energy 10 along a longitudinally adjacent lateral segment of the backing-film combination is begun when the conveyor carrying the backing-film combination restarts and the sensor detects the next lateral pass position. It should also be understood that if the sensor detects any interruption or reversion in the backing-film combination's longitudinal advancement before the power emitter 8 completes a given lateral scan, the gantry's movement will mimic that action until that lateral scan is completed. This sensor-driven coordination of movement of the backing-film combination, movement of the gantry carrying the laser emitter 8, movement of the laser emitter 8 along the gantry, and output operation of the laser emitter 8—all in view of the profile of the emitted laser beam 10—is intended to ensure that a desired degree of laser energy density is distributed uniformly to every point along the proximal face of the opaque inner film 4.

In any event, energy absorption occurs, at least in earnest, beginning at the proximal face of the opaque inner film 4, and the inner film 4 used should be selected for its thickness and opaqueness to the received energy wavelength such that energy absorption continues throughout every imaginary layer of the inner film's depth (and, ideally, neither stops occurring short of nor continues occurring beyond the distal face of the inner film 4). This raises the temperature of the opaque polyethylene material to liquify it. Additionally, heat conducts, from the molten material both back into the adjacent distal face of the transparent outer film 3 and forward to the yarn backloops 5 and backing face 1 to at least soften those adjacent materials to superficial depths and allow the opaque film material to fuse to each of them.

Simultaneously, the active suction force produced by the vacuum plenum causes the still solid outer film 3 to press the molten, opaque film material 4 toward the backing 1—infusing that molten material 4 into the interstices of the fibers of both the yarn backloops 5 and backing sheet 1, enrobing those fibers. And because polypropylene has a higher melting point than polyethylene, this enrobing occurs without disintegrating the polypropylene fibers of the backing 1. Therefore, it can be said that the opaque film 4 serves as a protective barrier for the woven polypropylene backing 1 (vis-h-vis the same laser energy projection into only a transparent film 3 that would allow backing fibers to be destroyed by radiant heat transfer). Furthermore, fusing liquified inner film material 4 to a substantially solid-remaining outer film 3, allows surface tension to inhibit the liquified material 4 from laterally contracting and forming gaps or significantly altering the profiles of designed drainage holes within the inner film 4.

As evidenced by the comparison photos shown in FIGS. 4 & 5, the present inventor has observed that applied laser energy disintegrates woven polypropylene backing material to an extent that would greatly undermine the usefulness of a turf product in which the polypropylene backing layer 1 was more fully exposed to applied laser energy 10 in the absence of an intervening opaque film layer 4 (i.e., exposed to the applied energy 10 beyond its minimal exposure, in the preferred embodiment, through aligned drainage perforations residing in the transparent and opaque film layers 3, 4). The FIG. 4_photos reveal damage that occurred to polypropylene backing fibers when only a transparent polyethylene film was used for lamination, whereas the FIG. 5_photos show no such damage when both transparent and opaque polyethylene films were used.

This illustrates the point that the opaqueness of the inner film 4 employed in the present construct substantially protects the primary backing 1 from what would be the much more invasive and destructive effects of broadly receiving and absorbing laser energy 10 not intercepted by an opaque barrier 4 disposed between the laser emitter 8 and the backing 1. But, using only an opaque laminating film that would melt and laterally contract in the absence of a solid remaining transparent film may create voids in the laminate and would fail to achieve the tuft lock exhibited by the present construct.

It should be understood that the previously described delivery of near infrared or visible energy into the previously described arrangement of tufted good elements to facilitate nearly instantaneous material fusion and tufted backing lamination is unique to the present disclosure. As such, this disclosure represents a dramatically quicker process than the time it would realistically take to laminate or coat a tufted backing with a thermoplastic sheet or coating material using a heating or spray coating process disclosed by the prior art.

Some additional apparatus aspects of the disclosure are not reflected in the accompanying drawings. One such aspect is the use of a sheet of transparent [to the utilized near infrared or visible energy] mesh material positioned between the transparent and opaque film sheets 3, 4. In an embodiment in which transparent mesh is used, delivered energy 10 causes the mesh sheet to directly bond to both the opaque inner film sheet 4 and the transparent outer film sheet 3 and may enhance the mechanical strength otherwise provided by the outer film 3.

Finally, it is further understood that substitutions and equivalents for various elements set forth above may be obvious to those skilled in the art and may not represent a departure from the spirit of the invention. Therefore, the full scope and definition of the present invention is to be set forth by the claims that follow.

What is claimed is:

1. A method for laminating a tufted backing sheet having a pile face from which yarn piles project and an opposing bottom face having some of its surface area overlaid by yarn backloops, the method comprising:

placing an inner film that is substantially opaque to visible and near infrared energy over the backing sheet bottom face;

placing an outer film that is substantially transparent to visible and near infrared energy over the inner film;

urging the inner film into intimate contact with the backing sheet; and directing visible or near infrared energy through the outer film and into the inner film to melt the inner film and cause it to infuse into the interstices of the fibers of the backing sheet and yarn backloops.

2. The method of claim 1, further comprising diverging the visible or near infrared energy with optics before it reaches said outer film.

3. The method of claim 2, wherein the visible or near infrared energy is diverged in one dimension and is oscillated in another dimension.

4. The method of claim 3, wherein said diverged visible or near infrared energy is distributed substantially evenly to substantially every position within a cross-sectional area of a surface of said outer film.

5. The method of claim 1, further comprising:

selecting said inner film to have an opaqueness and depth that causes said directed energy to travel substantially entirely through and be substantially fully absorbed by that entire depth.

6. The method of claim 5, further comprising:

selecting said outer film to have a transparency and depth that causes said directed energy to travel entirely through and be substantially unabsorbed by said outer film.

7. A method for laminating a tufted backing sheet having a pile face from which yarn piles project and an opposing bottom face having some of its surface area overlaid by yarn backloops, the method comprising:

placing a film that is substantially transparent to visible and near infrared energy over the backing sheet bottom face;

urging the film toward the backing sheet and yarn backloops; and directing visible or near infrared energy through the film.

8. The method of claim 7, further comprising diverging the visible or near infrared energy with optics before it reaches said film.

9. The method of claim 8, wherein the visible or near infrared energy is diverged in one dimension and is oscillated in another dimension.

10. The method of claim 9, wherein said diverged visible or near infrared energy is distributed substantially evenly to substantially every position within a cross-sectional area of a surface of said film.

11. The method of claim 10, further comprising:

selecting said film to have a transparency and depth that causes said directed energy to travel entirely through and be substantially unabsorbed by said film.

* * * * *